United States Patent
Ikeda et al.

(10) Patent No.: US 10,105,784 B2
(45) Date of Patent: Oct. 23, 2018

(54) WELD LINE-DETECTING METHOD AND INDUSTRIAL ROBOT

(71) Applicant: Panasonic Intellectual Property Management Co., Ltd., Osaka (JP)

(72) Inventors: Tatsuya Ikeda, Hyogo (JP); Hisashi Kataoka, Osaka (JP); Tetsuya Takayama, Osaka (JP); Yasushi Mukai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 540 days.

(21) Appl. No.: 14/220,501

(22) Filed: Mar. 20, 2014

(65) Prior Publication Data

US 2014/0203001 A1    Jul. 24, 2014

Related U.S. Application Data

(63) Continuation of application No. PCT/JP2013/001547, filed on Mar. 11, 2013.

(30) Foreign Application Priority Data

Mar. 16, 2012    (JP) .................. 2012-059796

(51) Int. Cl.
*B23K 9/12*    (2006.01)
*B23K 9/127*    (2006.01)
*B23K 9/025*    (2006.01)

(52) U.S. Cl.
CPC ............ *B23K 9/1278* (2013.01); *B23K 9/025* (2013.01); *Y10S 901/42* (2013.01)

(58) Field of Classification Search
CPC .... B23K 9/1278; B23K 9/1272; B23K 9/127; B23K 9/025; B23K 9/126

(Continued)

(56) References Cited

U.S. PATENT DOCUMENTS 3,452,180 A * 6/1969 Harrison .............. B23K 9/1272
                                                  219/124.33
4,042,161 A * 8/1977 Ando .................... B23K 9/025
                                                  228/102

(Continued)

FOREIGN PATENT DOCUMENTS

CN    201516530 U    6/2010
CN    102310258    1/2012

(Continued)

OTHER PUBLICATIONS

European Office Action dated Oct. 21, 2015 in European Application No. 13 76 0686.

(Continued)

*Primary Examiner* — Tu B Hoang
*Assistant Examiner* — Alba Rosario-Aponte
(74) *Attorney, Agent, or Firm* — Wenderoth, Lind & Ponack, L.L.P.

(57) ABSTRACT

The present invention is a weld line-detecting method when fillet welding by an industrial robot including a welding torch is taught. The welding torch on which an angle sensor having a contactor is attached is moved toward a welding object, angle information obtained when the contactor is in contact with the welding object is transmitted to the industrial robot, and the industrial robot moves the welding torch based on the angle information so that the angle of the contactor becomes zero. These operations are repeated, and the welding torch is moved toward a fillet part along the surface of the welding object. When the contactor arrives at the fillet part, a signal indicating that the contactor is pressed in the axial direction of the contactor is transmitted to the industrial robot. The industrial robot detects that the contactor arrives at the position to be welded on the weld line.

11 Claims, 6 Drawing Sheets

(58) Field of Classification Search
USPC .............. 219/124.1, 124.22, 124.33, 124.34, 219/124.46, 124.48, 124.59, 137 R
See application file for complete search history.

(56) References Cited

U.S. PATENT DOCUMENTS

| | | | |
|---|---|---|---|
| 2007/0293987 A1* | 12/2007 | Yamada | B25J 13/06 700/245 |
| 2010/0153061 A1* | 6/2010 | Hietmann | G01S 5/163 702/152 |
| 2010/0200554 A1 | 8/2010 | Uchida et al. | |
| 2011/0238215 A1* | 9/2011 | Yanagawa | G05B 19/42 700/258 |
| 2012/0000891 A1 | 1/2012 | Nakanishi et al. | |

FOREIGN PATENT DOCUMENTS

| | | | |
|---|---|---|---|
| CN | 102343472 | | 2/2012 |
| EP | 0076498 | A2 | 4/1983 |
| JP | S58-176078 | A | 10/1983 |
| JP | S59-199178 | A | 11/1984 |
| JP | 60-133979 | A | 7/1985 |
| JP | 62-081270 | A | 4/1987 |
| JP | 04-258377 | A | 9/1992 |
| JP | H04-367373 | A | 12/1992 |
| JP | 07-047472 | A | 2/1995 |
| JP | 10128538 | A * | 5/1998 |
| JP | H10-128538 | A | 5/1998 |
| JP | 10-207524 | | 8/1998 |
| JP | 2009-012035 | A | 1/2009 |
| KR | 10-2007-0113764 | * | 11/2007 |

OTHER PUBLICATIONS

English Translation of Chinese Search Report dated Jul. 30, 2015 for the related Chinese Patent Application No. 201380003777.7.
International Application for PCT/JP2013/001547 dated Apr. 16, 2013.

* cited by examiner

WELD LINE-DETECTING METHOD AND INDUSTRIAL ROBOT

BACKGROUND

1. Technical Field

The present invention relates to a weld line-detecting method that facilitates teaching of fillet welding, for example, and relates to an industrial robot.

2. Background Art

Technology where a sensor is disposed in a welding torch and detects a welding position is known in relation to a weld line-detecting method when a welding position is taught to a welding robot before fillet welding (for example, Unexamined Japanese Patent Publication No. S58-176078).

As shown in FIG. 8C, sensor 83 is disposed in a part of the outer periphery of welding torch 82 out of which welding core (welding wire) 81 is projected. When welding torch 82 is located with reference to fillet, welding position P on the Y-Z plane as shown in FIG. 8A, pressing welding torch 82 in the direction of welding core 81 generates bending moment Md in welding torch 82. Sensor 83 detects bending moment Md. The correspondence between the direction of bending moment Md and the position of welding torch 82 is previously set in the welding robot. On recognizing the position based on the direction of bending moment Md, the welding robot moves welding torch 82 toward fillet welding position P. Finally, the position state shown in FIG. 8B is provided. In the state of FIG. 8B, the bending moment does not occur in welding torch 82, and only axial force Fn, namely a force of the direction of welding core 81, is left.

SUMMARY

In the conventional weld line-detecting method, when the output from a circuit for axial force detection reaches a certain value or more, the movement of the welding torch is stopped. At this time, the welding core, namely the welding wire, is in the pressed state, and the projection length of the welding wire is shorter than a projection length required for original welding. In the conventional weld line-detecting method, however, an operation of releasing this state does not exist, and the correct welding position cannot be indicated.

While a welding position is taught to the welding robot, the welding robot detects the bending moment of the welding torch and always automatically operates the welding torch. However, the following case exists: even if the welding wire comes into contact with a welding workpiece, the welding robot is intended to operate without automatically operating the welding torch. In this case, a worker easily cannot switch and use the state where the bending moment of the welding torch is automatically detected and the state where the bending moment of the welding torch is not automatically detected.

When an operation error causes the welding core to be firmly pressed into a welding object or causes the welding core or welding torch to be bumped against the welding object, the welding core, the welding torch, or the sensor disposed in the welding torch breaks.

The sensor disposed in the welding torch is not detachable. Molten metal of an extremely high temperature is generated during welding, and therefore the possibility that the metal comes into contact with the sensor to damage the sensor is high.

A signal is transmitted from the sensor to the welding robot via an electric wire. Molten metal of an extremely high temperature is generated during welding, and therefore the possibility that the metal comes into contact with the electric wire to damage the electric wire is high.

In order to address the above-mentioned problems, the weld line-detecting method of the present invention is a weld line-detecting method when fillet welding by an industrial robot including a welding torch is taught. The weld line-detecting method of the present invention includes a first moving step of moving, toward a welding object, the welding torch on which an angle sensor having a contactor is attached. The weld line-detecting method of the present invention includes a transmitting step of transmitting, to the industrial robot, angle information obtained when the contactor is in contact with the welding object, and a second moving step of making the industrial robot move the welding torch based on the angle information so that the angle of the contactor becomes zero. The weld line-detecting method of the present invention includes a repeating step of moving the welding torch toward a fillet part along the surface of the welding object by repeating the first moving step, transmitting step, and second moving step. The weld line-detecting method of the present invention includes a detecting step of, when the contactor arrives at the fillet part of the welding object, making the industrial robot detect that the contactor arrives at the position to be welded on the weld line by transmitting, to the industrial robot, a signal indicating that the contactor is pressed in the axial direction thereof.

The weld line-detecting method of the present invention further includes a first stopping step of, after the detecting step, stopping the movement of the welding torch.

The weld line-detecting method of the present invention further includes a releasing step of, after the first stopping step, releasing the pressed state of the contactor by moving the welding torch by the pressed amount of the contactor in the pressed direction of the contactor.

The weld line-detecting method of the present invention further includes a second stopping step of, after the first moving step and before the transmitting step, stopping a movement of the welding torch when the contactor comes into contact with the welding object to make the angle of the contactor larger than a predetermined angle.

The weld line-detecting method of the present invention, furthermore, the second stopping step is performed in a state of normal mode, the transmitting step, the second moving step, the repeating step and the detecting step are performed in a state of sensor mode. And The weld line-detecting method of the present invention further includes a mode switching step of, after the second stopping step and before the transmitting step, switching the state of normal mode to the state of sensor mode.

In the weld line-detecting method of the present invention, furthermore, the angle sensor further includes a radio communication section for angle sensor use for outputting the angle information of the contactor and the information indicating that the contactor is pressed. The industrial robot includes a manipulator to which the welding torch is attached, a robot controller for controlling the operation of the manipulator, and a teaching device for communicating with the robot controller. The robot controller acquires information output from the radio communication section for angle sensor use via the teaching device or directly from the angle sensor.

In the weld line-detecting method of the present invention, furthermore, the teaching device further includes an attachable/detachable radio communication section for teaching device use. The teaching device receives information output from the angle sensor with the radio communication section for teaching device use, and transmits the information received from the angle sensor to the robot controller.

In the weld line-detecting method of the present invention, furthermore, the first moving step is performed based on an operation program stored in a controller of the industrial robot.

In the weld line-detecting method of the present invention, furthermore, the first moving step is performed by a manual operation of the industrial robot by the worker using the teaching device that is connected to the industrial robot.

In the weld line-detecting method of the present invention, furthermore, in the state where a nozzle and feed chip are detached from the welding torch, instead of the feed chip, the angle sensor is attached to the welding torch.

In the weld line-detecting method of the present invention, furthermore, the peripheral dimension of the angle sensor to be attached to the welding torch is not greater than the peripheral dimension of the nozzle to be attached to the welding torch.

In the weld line-detecting method of the present invention, furthermore, the movement of the welding torch is stopped when the angle of the contactor becomes a predetermined angle or larger.

The industrial robot of the present invention includes a manipulator having a welding torch, a robot controller for controlling the operation of the manipulator, and a teaching device for communicating with the robot controller. The industrial robot of the present invention is an industrial robot for performing fillet welding. An angle sensor having a contactor is attached on the welding torch. The robot controller includes a control section that receives the angle information of the contactor directly from the angle sensor or via the teaching device and performs processing. The industrial robot of the present invention performs a first moving step of moving, toward a welding object, the welding torch on which the angle sensor having the contactor is attached. The industrial robot of the present invention performs a receiving step of receiving, from the angle sensor, angle information obtained when the contactor is in contact with the welding object. The industrial robot of the present invention performs a second moving step of moving the welding torch based on the angle information so that the angle of the contactor becomes zero. The industrial robot of the present invention performs a repeating step of moving the welding torch toward a fillet part along the surface of the welding object by repeating the first moving step, receiving step, and second moving step. The industrial robot of the present invention performs a detecting step of, when the contactor arrives at the fillet part of the welding object, detecting that the welding torch arrives at the position to be welded on the weld line by receiving a signal indicating that the contactor is pressed in the axial direction thereof.

In the present invention, thus, the angle sensor is attached to the welding torch, and the welding torch is moved so that the angle of the contactor becomes zero based on the angle information obtained when the contactor of the angle sensor is in contact with the welding object. Thus, the weld line can be detected easily.

DESCRIPTION OF EMBODIMENTS

Exemplary embodiments of the present invention will be described hereinafter with reference to FIG. 1A through FIG. 7B.

First Exemplary Embodiment

Figure 1A:
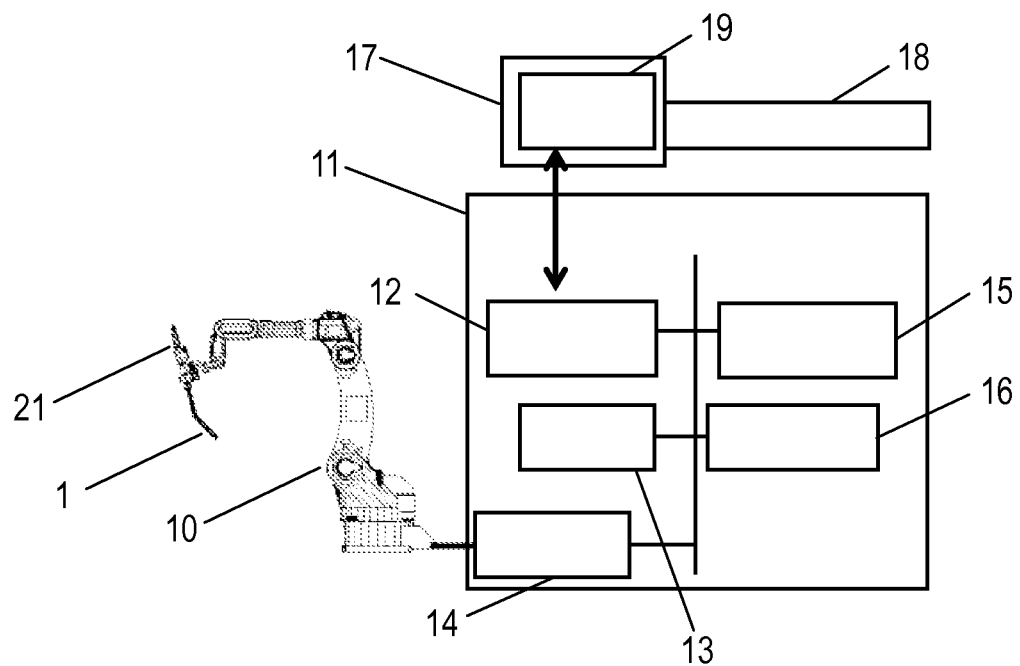
FIG. 1A is a diagram showing a schematic configuration of a robot system in accordance with a first exemplary embodiment of the present invention.
Figure 1B:
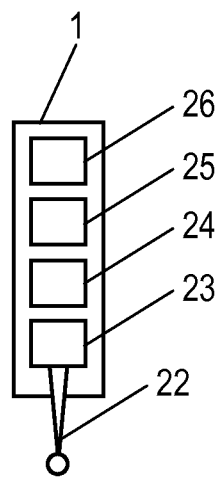
FIG. 1B is a diagram showing a schematic configuration of an angle sensor in accordance with the first exemplary embodiment of the present invention.

FIG. 1A is a diagram showing a schematic configuration of a robot system. FIG. 1B is a diagram showing a schematic configuration of an angle sensor.

In FIG. 1A, the robot system mainly includes an industrial robot, namely manipulator 10, robot controller 11, and teaching device 17. Manipulator 10 has a plurality of joint axes, and each of the joint axes is constituted by a motor (not shown) and a speed reducer (not shown). Robot controller 11 contras the entire robot system. Teaching device 17 is used in order that a worker operates manipulator 10 to create a teaching program, for example.

Teaching device 17 includes second CPU (central processing unit) 19 for controlling the communication with robot controller 11, and second radio communication section 18 as a radio communication section for teaching device use for performing radio communication with an external apparatus. Second radio communication section 18 is attachable to and detachable from teaching device 17.

Robot controller 11 includes first CPU 12, RAM (random access memory) 13, driving section 14, first radio communication section 15, and ROM (read only memory) 16. First CPU 12 performs control or the like of the entire robot system. The teaching program created by the worker is stored in RAM 13, and can be read or written at any time. Driving section 14 controls the motor of manipulator 10 and controls the position and attitude of welding torch 21. First radio communication section 15 is a radio communication section for robot controller use, and performs radio communication with an external apparatus. ROM 16 is a read only memory in which a robot control program for controlling robot controller 11 is stored.

Welding torch 21 is attached on manipulator 10. Angle sensor 1 shown in FIG. 1B is attached on welding torch 21.

Welding torch 21 applies arc voltage to a welding wire to generate arc, and supplies the welding wire to a welding object to continuously generate arc. Generally, on the tip of welding torch 21, a welding chip (not shown) for applying arc voltage to the welding wire and a nozzle (not shown) for supplying welding gas are attached. When angle sensor 1 is attached to welding torch 21, the welding chip and nozzle are detached, and angle sensor 1 is attached instead of them.

At this time, the dimensions of angle sensor 1 and contactor 22 are determined so that the tip position of the welding wire before the attachment of angle sensor 1 and the tip position of contactor 22 after the attachment of angle sensor 1 indicate the same position. This determination is intended to produce the following condition:

when the worker performs the teaching work, the teaching work is performed so that the tip of the welding wire indicates the position to be welded of the welding object, but, even when angle sensor 1 is attached, the teaching work can be performed at the same position as that of the case of the indication by the welding wire.

The peripheral dimension of angle sensor 1 to be attached to welding torch 21 is not greater than that of the nozzle to be attached to welding torch 21.

As shown in FIG. 1B, angle sensor 1 attached to welding torch 21 includes, as components, contactor 22, sensor section 23, third CPU 24, third radio communication section 26, and battery 25. Contactor 22 comes into contact with the welding object. Sensor section 23 detects the angle and pressed state of contactor 22. Third CPU 24 reads information from sensor section 23. Third radio communication section 26 is a radio communication section for angle sensor use, and transmits the information read by third CPU 24 to robot controller 11. Battery 25 supplies power to sensor section 23, third CPU 24, and third radio communication section 26.

Third CPU 24 reads angle information from sensor section 23, and transmits the angle information to robot controller 11 via third radio communication section 26.

Robot controller 11 includes first radio communication section 15 for receiving the angle information transmitted from angle sensor 1, and first CPU 12 in robot controller 11 reads the angle information via first radio communication section 15.

Figure 2:
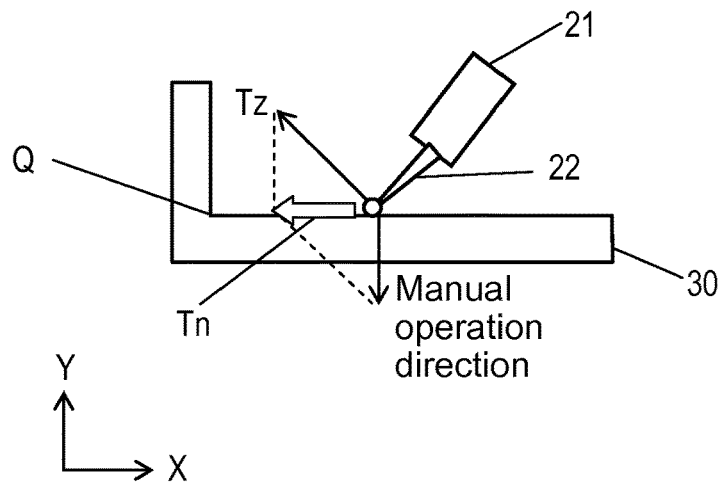
FIG. 2 is an explanatory diagram of the welding position detecting operation in accordance with the first exemplary embodiment of the present invention.
Figure 3:
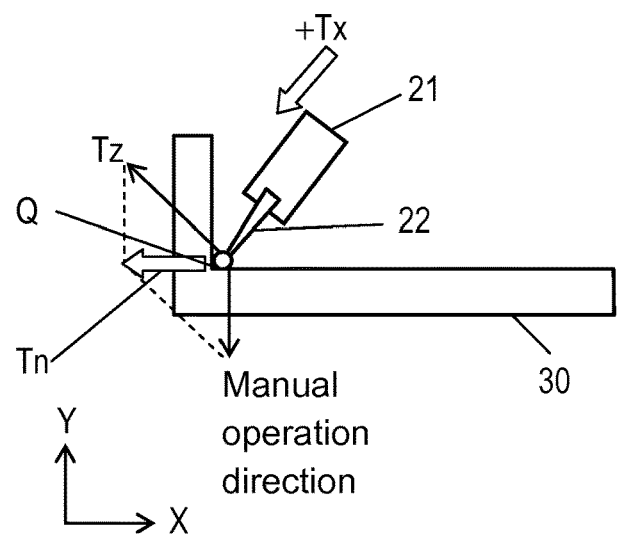
FIG. 3 is another explanatory diagram of the welding position detecting operation in accordance with the first exemplary embodiment of the present invention.
Figure 4:
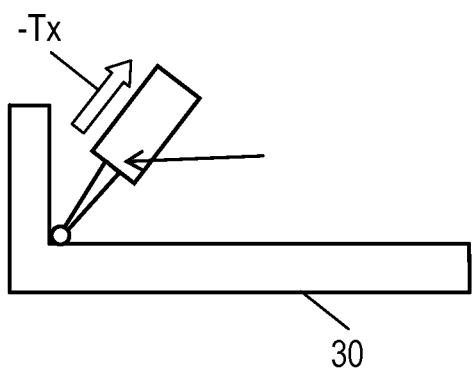
FIG. 4 is yet another explanatory diagram of the welding position detecting operation in accordance with the first exemplary embodiment of the present invention.

Next, using FIG. 2 through FIG. 4, the operation of the robot system of the present exemplary embodiment is described. FIG. 2 through FIG. 4 are explanatory diagrams of the welding position detecting operation of the present exemplary embodiment. In FIG. 2, when a worker performs the teaching work by operating manipulator 10 using teaching device 17, welding torch 21 is moved toward welding object 30, namely in the −Y direction. This operation is set as a first moving step. Welding torch 21 of FIG. 1A is attached on manipulator 10, and angle sensor 1 of FIG. 1B is attached on welding torch 21.

When contactor 22 is not in contact with welding object 30, contactor 22 is in the state of angle θ=0, and the angle information read by sensor section 23 of FIG. 1B is "angle θ=0". Third CPU 24 transmits the angle information to robot controller 11 via third radio communication section 26.

When contactor 22 is in contact with welding object 30 and contactor 22 is tilted from the state of angle θ=0, namely when angle θ is not 0 but α the angle information of sensor section 23 is not "angle θ=0" but "relative angle θ=α from the state of angle θ=0". Third CPU 24 transmits "angle θ=α" as the angle information to robot controller 11 via third radio communication section 26. This operation is set as a transmitting step.

Angle θ as the angle information transmitted from angle sensor 1 is received by first CPU 12 via first radio communication section 15 disposed in robot controller 11. First CPU 12 moves welding torch 21 in shift direction Tz so that the angle of contactor 22 becomes 0 from angle θ as the received angle information.

The relationship between welding torch 21 and the shift direction depends on the direction in which angle sensor 1 is attached to welding torch 21. In other words, when the tilted direction of contactor 22 of angle sensor 1 is represented by X-Y, the angle information is input as X-Y information likewise, and the X-Y information indicates the tilted direction of contactor 22. The attached direction of angle sensor 1 to welding torch 21 uniquely determines the tilted direction of contactor 22 and the shift direction of welding torch 21. When contactor 22 is tilted, angle sensor 1 is required to be attached to welding torch 21 in the direction for releasing the tilted state. The operation amount in the shift direction varies in proportion to the input amount from angle sensor 1. When the angle of contactor 22 is small, the input amount decreases and the shift amount in the shift direction also decreases. When the angle of contactor 22 is large, the input amount increases and the shift amount in the shift direction also increases.

At this time, the worker continues the operation for moving welding torch 21 toward welding object 30, namely in the −Y direction. Therefore, the combination of the movement in the manual operation direction (−Y direction) and the movement in shift direction Tz becomes movement in the Tn direction. This operation is set as a second moving step.

By repeating the first moving step, transmitting step, and second moving step, welding torch 21 moves toward fillet, part Q along the surface of welding object 30. This operation is set as a repeating step.

The tilted direction of contactor 22 and the shift direction of welding torch 21 are uniquely determined. Therefore, in order to move welding torch 21 toward fillet, part Q, the worker is required to bring welding torch 21 into contact with welding object 30 at the forward angle of welding torch 21 with respect to the direction of fillet part Q. The forward angle means the angle between welding torch 21 and welding object 30 shown in FIG. 2.

Then, as shown in FIG. 3, when contactor 22 arrives at fillet part Q of welding object 30, contactor 22 is pressed in the axial direction. Sensor section 23 of FIG. 1B detects the pressed state of contactor 22, and third CPU 24 transmits information to robot controller 11 via third radio communication section 26. The information that is transmitted from angle sensor 1 and indicates the pressed state of contactor 22 is received by first CPU 12 via first radio communication section 15 disposed in robot controller 11. Thus, robot controller 11 detects that welding torch 21 arrives at the position to be welded on the weld line. This operation is set as a detecting step.

Examples of the mechanism of detecting the angle information of contactor 22 with sensor section 23 are a mechanism and the like of detecting the position of contactor 22 with a Hall element sensor using a Hall effect. Thus, a general sensor can be used.

First CPU 12 stops the movement of welding torch 21 based on the received information indicating the state where contactor 22 is pressed. This operation is set as a first stopping step. Thus, the detection of fillet, part Q of welding object 30, namely detection of the weld line, is completed. In this state, when the worker performs a teaching point registering operation using teaching device 17, the angle information of each joint of manipulator 10 is stored as positional information in RAM 13 of robot controller 11. Thus, teaching point registering processing is completed.

After first CPU 12 stops the movement of welding torch 21 based on the received information indicating the state where contactor 22 is pressed, sensor section 23 of angle sensor 1 detects pressed amount Δ of contactor 22. Third CPU 24 reads pressed amount Δ from sensor section 23, and transmits pressed Amount Δ to robot controller 11 via third radio communication section 26. First CPU 12 of robot controller 11 reads pressed amount Δ via first radio communication section 15, and moves manipulator 10 by controlling driving section 14. Thus, welding torch 21 is moved by pressed amount Δ in the −Tx direction opposite to the torch direction, as shown by the arrow of FIG. 4. After the movement by pressed amount Δ in the −Tx direction is completed, the operation is stopped. At this time, the pressed state of contactor 22 is released. This operation is set as a releasing step.

In the present exemplary embodiment, thus, robot controller 11 moves welding torch 21 by controlling manipulator 10 based on the angle information from angle sensor 1 so that the angle of contactor 22 becomes zero. Thus, the weld line can be easily detected.

In the above-mentioned example, the angle information from angle sensor 1 is taken into first CPU 12 of robot controller 11 via first radio communication section 15 of robot controller 11. However, the following example may be employed:

teaching device 17 includes second radio communication section 18, and second CPU 19 in teaching device 17 reads the angle information via second radio communication section 18 and transmits the angle information to first CPU 12 in robot controller 11.

Second radio communication section 18 may have a structure attachable to and detachable from teaching device 17. Examples of the attachable/detachable structure are a USB (universal serial bus) radio module and an SD (secure digital) card radio module.

A general radio communication method is used as the method of radio communication between angle sensor 1 and first radio communication section 15 of robot controller 11, or the method of radio communication between angle sensor 1 and second radio communication section 18 connected to teaching device 17. Examples of the general radio communication method are a radio LAN (local area network) communication conformable to IEEE (Institute of Electrical and Electronics Engineers) 802.11 standard and a near field radio communication conformable to IEEE 802.15 standard.

As the mechanism of the battery of second radio communication section 18, a general battery such as a coin-type battery or an electrical double layer capacitor can be employed. When a rechargeable battery is employed, a charging connector may be disposed in the battery, and the battery may be charged from a general-purpose power supply such as a domestic power supply or USE power supply.

Alternatively, a connector for power supply may be disposed in teaching device 17, and the battery may be charged.

Alternatively, a USB connector may be disposed in teaching device 17, and the battery may be charged from the USB power supply.

Second Exemplary Embodiment

In a second exemplary embodiment, elements similar to those in the first exemplary embodiment are denoted with the same reference marks, and the descriptions of those elements are omitted. The second exemplary embodiment differs from the first exemplary embodiment mainly in that sensor mode and normal mode, which are described later, are disposed and switched.

Figure 5:
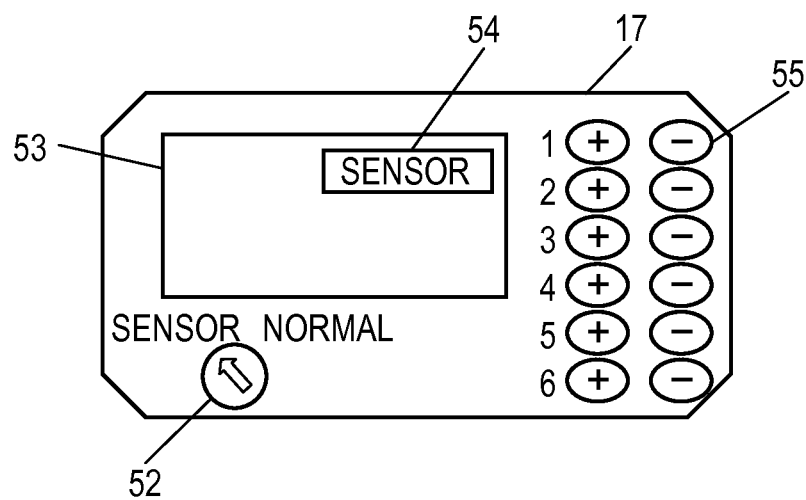
FIG. 5 is a diagram showing the appearance of a teaching device in accordance with a second exemplary embodiment of the present invention.

Teaching device 17 is described using FIG. 5. FIG. 5 is a diagram showing the appearance of teaching device 17. Teaching device 17 includes mode switch 52 for switching the modes described later, display screen 53, mode display section 54, and operation key 55.

In FIG. 5, when mode switch 52 is switched to the "SENSOR" side, the sensor mode is selected, and the detection of the weld line described in the first exemplary embodiment is performed. At this time, mode display section 54, which is a part of display screen 53, indicates that the sensor mode is selected. For example, "SENSOR" is displayed as the displayed contents.

When mode switch 52 is switched to the "NORMAL" side, the normal mode is selected. At this time, mode display section 54, which is a part of display screen 53, indicates that the normal mode is selected. For example, "NORMAL" is displayed as the displayed contents.

The normal mode is described hereinafter. As described using FIG. 2, the worker performs the first moving step of moving welding torch 21 on which angle sensor 1 of FIG. 1B is attached. When contactor 22 comes into contact with welding object 30 and contactor 22 is tilted from the state of angle θ=0, namely when angle θ is not 0, robot controller 11 stops the movement of welding torch 21 if the angle of contactor 22 becomes larger than predetermined angle β. This operation is set as a second stopping step. At this time, movement to fillet part Q is not performed. In other words, contactor 22 is in contact with welding object 30 and is kept in the stopping state. This is set as normal mode. The value of predetermined angle β can be set by the worker using teaching device 17.

When the worker switches mode switch 52 from "NORMAL" side to "SENSOR" side in the state where the movement of welding torch 21 is stopped and angle θ of the contactor is not 0, the sensor mode is selected. This operation is set as a mode switching step. In the sensor mode, the detection of the weld line having been described in the first exemplary embodiment is performed. The processing at this time is described hereinafter.

Figure 6A:
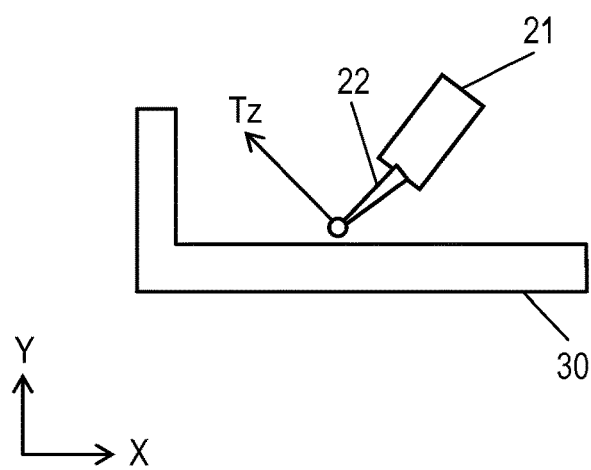
FIG. 6A is an explanatory diagram of the movement of a welding torch in accordance with the second exemplary embodiment of the present invention.
Figure 6B:
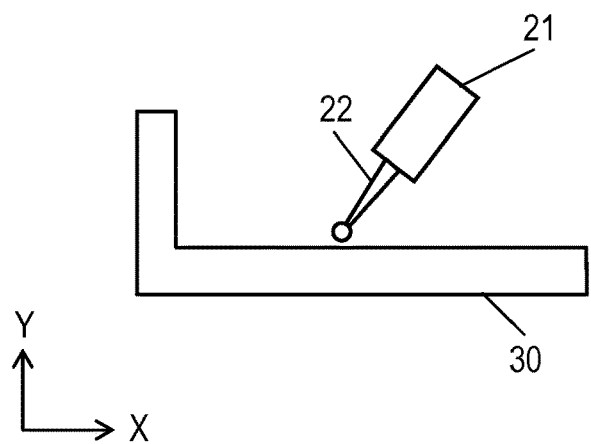
FIG. 6B is another explanatory diagram of the movement of the welding torch in accordance with the second exemplary embodiment of the present invention.

When mode switch 52 is switched to "SENSOR" side in the state where the movement of welding torch 21 is stopped and the worker stops operating welding torch 21, the moving amount in the manual operation direction, namely in the −Y direction, does not occur. In this case, as shown in FIG. 6A, the moving amount only in shift direction Tz occurs, and welding torch 21 moves in shift direction Tz. As a result, contactor 22 comes into the state of angle θ=0 and the movement of welding torch 21 in shift direction Tz is stopped. This state is shown in FIG. 6B. Thus, contactor 22 comes into the state of angle θ=0, and the tip of contactor 22 is located on the surface of welding object 30. The worker can continue a desired teaching work from this state. The weld line may be detected while the sensor mode is kept. Alternatively, the mode may be switched to the normal mode, and the teaching work may be continued or the teaching point registering operation may be performed.

In the "SENSOR" mode, if contactor 22 is tilted, the tilted state of contactor 22 is released by a shift operation by welding torch 21. When welding torch 21 is brought into contact with welding object 30 at a certain high speed, however, contactor 22 is significantly tilted in a short time. In this case, the shift operation for releasing the tilted state of contactor 22 is too late for the action where welding torch 21 comes into contact with welding object 30 at the high speed, and hence the possibility of damaging angle sensor 1 is high. Therefore, the worker usually operates welding torch 21 in the "NORMAL" mode. In the "NORMAL" mode, even when welding torch 21 is brought into contact with welding object 30 at a certain high speed, robot controller 11 stops the movement of welding torch 21 if the angle of contactor 22 becomes larger than predetermined angle β. Then, the worker switches the mode to the "SENSOR" side and operates welding torch 21 at a low speed, thereby performing the weld line-detecting operation without damaging angle sensor 1.

Third Exemplary Embodiment

In a third exemplary embodiment, elements similar to those in the first exemplary embodiment and second exemplary embodiment are denoted with the same reference marks, and the descriptions of those elements are omitted. The third exemplary embodiment differs from the first exemplary embodiment and second exemplary embodiment mainly in that the movement of welding torch 21 is stopped immediately after the angle of contactor 22 becomes larger than predetermined angle γ.

Figure 7A:
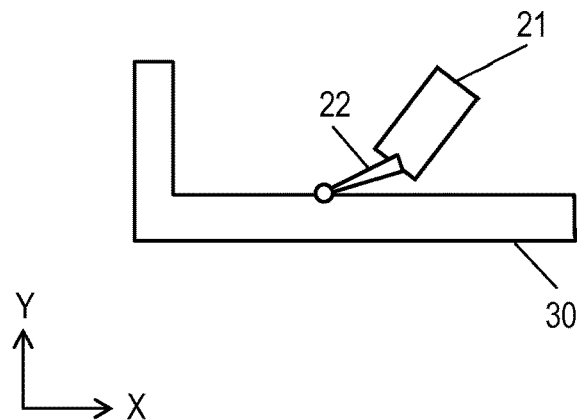
FIG. 7A is an explanatory diagram of the movement of a welding torch in accordance with a third exemplary embodiment of the present invention.

The angle information of contactor 22 is periodically transmitted to first CPU 12 of robot controller 11. As shown in FIG. 7A, when contactor 22 comes into contact with welding object. 30 and the angle of contactor 22 becomes larger than predetermined angle γ, angle information γ is transmitted to first CPU 12 of robot controller 11. Then, first CPU 12 immediately stops the movement, of welding torch 21.

The purpose of this is to prevent damage of contactor 22 or angle sensor 1. The damage preventing processing is effective in both of the sensor mode and normal mode that have been described in the second exemplary embodiment.

The value of angle γ is set larger than the value of angle β. The value of angle γ can be set by the worker using teaching device 17.

Figure 7B:
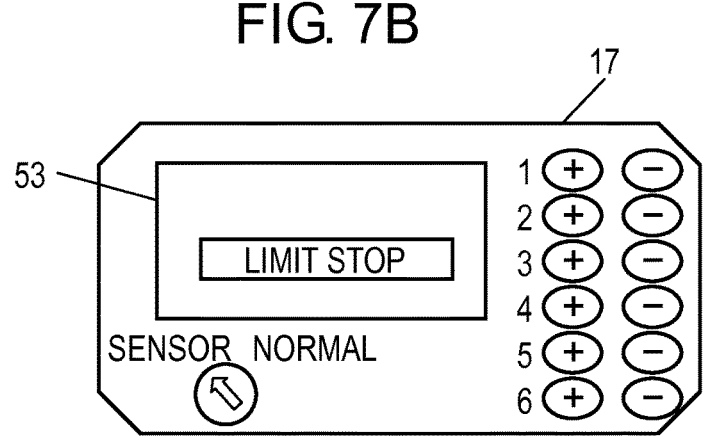
FIG. 7B is a diagram showing the appearance of a teaching device in accordance with the third exemplary embodiment of the present invention.
Figure 8A:
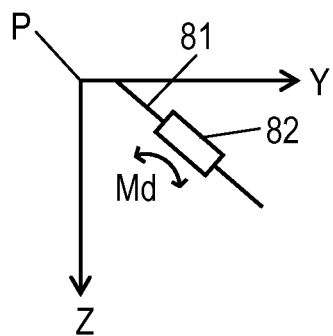
FIG. 8A is an explanatory diagram of the movement of a conventional welding torch.
Figure 8B:
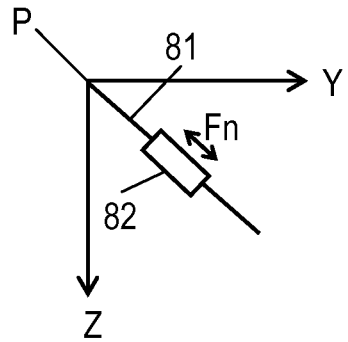
FIG. 8B is another explanatory diagram of the movement of the conventional welding torch.
Figure 8C:
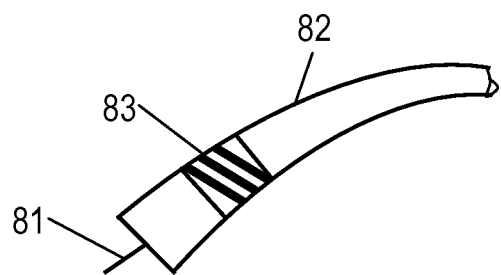
FIG. 8C is a diagram showing the appearance of the conventional welding torch.

With the timing when first CPU 12 of robot controller 11 stops welding torch 21, "LIMIT STOP" is displayed on display screen 53 of teaching device 17 as shown in FIG. 7B, and the worker can recognize that welding torch 21 is stopped for damage prevention.

When the worker switches mode switch 52 to the "SENSOR" side in this state, the sensor mode is selected, and the detection of the weld line described in the first exemplary embodiment is performed.

In the normal mode, two thresholds, predetermined angle β and predetermined angle γ, are set. Thus, safety such as damage prevention can be further increased.

In the sensor mode, predetermined angle γ is a threshold for the stop and damage prevention can be performed. In the sensor mode, after the stop for a predetermined time, the operation of the sensor mode may be started without keeping the stop.

Thus, in the present exemplary embodiment, by stopping the movement of welding torch 21 when the angle of contactor 22 becomes larger than predetermined angle γ, the damage of angle sensor 1 or welding torch 21 can be prevented.

The first exemplary embodiment through third exemplary embodiment have described the detection of the weld line when the worker continues the first moving step using teaching device 17. However, the following operation may be employed:

based on an operation program, for example, stored in robot controller 11, the first moving step is continued automatically and the weld line is detected.

The present invention is industrially useful as a weld line-detecting method when fillet welding is taught, for example, and as an industrial robot for performing the teaching.

What is claimed is:

1. A weld line-detecting method for fillet welding the weld-line detecting method comprising:
    measuring first angle information when a contactor of an industrial robot is not in contact with a surface of a welding object, wherein (i) the industrial robot includes a welding torch and an angle sensor having the contactor, (ii) the angle sensor is attached to the welding torch, and (iii) the first angle information indicating a tilted direction of the contactor with respect to the surface of welding object when the contactor is not in contact with the welding object;
    moving the welding torch in a first direction toward the welding object so that the contactor is in contact with the welding object;
    measuring second angle information when the contactor is in contact with the surface of the welding object, wherein the second angle information is different from the first angle information, and the second angle information indicates a relative angle between (i) a tilted direction of the contactor with respect to the surface of the welding object when the contactor is in contact with the welding object and (ii) the tilted direction of the contactor with respect to the surface of the welding object when the contactor is not in contact with the welding object; making the industrial robot move the welding torch in a second direction based on the first angle information and the second angle information, wherein a combination of the movement of the welding torch in the first direction and the movement of the welding torch in the second direction causes the relative angle to become zero; and
    causing the welding torch to move along the surface of the welding object toward a fillet part of the welding object in a third direction perpendicular to the first direction as a result of a combination of (i) the movement of the welding torch in the first direction and (ii) the movement of the welding torch in the second direction; and
    causing the industrial robot to detect that the contactor arrives at the fillet part of the welding object when the contactor is pressed in an axial direction of the contactor.

2. The weld line-detecting method of claim 1, further comprising,
    stopping, after the detecting step, a movement of the welding torch.

3. The weld line-detecting method of claim 2, further comprising,
   after the stopping the movement of the welding torch, releasing a pressed state of the contactor by moving the welding torch by a pressed amount of the contactor in a direction opposite to a pressed direction of the contactor.
4. The weld line-detecting method of claim 1, wherein
   the angle sensor includes a sensor section for detecting an angle of the contactor,
   the angle sensor includes a central processing unit for periodically reading the angle of the contactor detected by the angle sensor, and
   the weld line-detecting method further comprises stopping a movement of the welding torch when the contactor comes into contact with the welding object to make the angle of the contactor larger than a predetermined angle.
5. The weld line-detecting method of claim 1, wherein
   the angle sensor further includes a radio communication section for angle sensor use for outputting angle information of the contactor and information indicating that the contactor is pressed,
   the industrial robot includes a manipulator to which the welding torch is attached, a robot controller for controlling an operation of the manipulator, and a teaching device for communicating with the robot controller, and
   the robot controller acquires information output from the radio communication section for angle sensor use via the teaching device or directly from the angle sensor.
6. The weld line-detecting method of claim 5, wherein
   the teaching device further includes an attachable/detachable radio communication section for teaching device use,
   the teaching device receives information output from the angle sensor via the radio communication section for teaching device use, and
   the teaching device transmits the information received from the angle sensor to the robot controller.
7. The weld line-detecting method of claim 1, wherein
   the moving the welding torch in a first direction is performed based on an operation program stored in a controller of the industrial robot.
8. The weld line-detecting method of claim 1, wherein
   the moving the welding torch in a first direction is performed by a manual operation of the industrial robot by a worker using the teaching device connected to the industrial robot.
9. The weld line-detecting method of claim 1, wherein
   in a state where a nozzle and a feed chip are detached from the welding torch, instead of the feed chip, the angle sensor is attached to the welding torch.
10. The weld line-detecting method of claim 1, wherein
    a peripheral dimension of the angle sensor to be attached to the welding torch is not greater than a peripheral dimension of a nozzle to be attached to the welding torch.
11. The weld line-detecting method of claim 1, wherein
    the angle sensor includes a sensor section for detecting an angle of the contactor,
    the angle sensor includes a central processing unit for periodically reading the angle of the contactor detected by the angle sensor, and
    a movement of the welding torch is stopped when an angle of the contactor becomes a predetermined angle or larger.

\* \* \* \* \*